United States Patent [19]
Goss et al.

[11] Patent Number: 6,039,004
[45] Date of Patent: Mar. 21, 2000

[54] CELLULOSIC ANIMAL LITTER PRODUCT

[75] Inventors: G. Robert Goss, Quincy; Robert Soral, Glenview, both of Ill.

[73] Assignee: Oil-Dri Corporation of America, Chicago, Ill.

[21] Appl. No.: 09/023,475

[22] Filed: Feb. 13, 1998

[51] Int. Cl.[7] ................................. A01K 29/00
[52] U.S. Cl. .......................... 119/172; 424/76.6
[58] Field of Search ................... 119/172, 173, 119/171, 526; 424/76.6

[56] References Cited

U.S. PATENT DOCUMENTS

| | | | |
|---|---|---|---|
| 3,352,792 | 11/1967 | Clark | 252/193 |
| 3,675,625 | 7/1972 | Miller et al. | 119/1 |
| 3,789,797 | 2/1974 | Brewer | 119/173 |
| 3,828,731 | 8/1974 | White | 119/1 |
| 3,833,731 | 9/1974 | Grier et al. | 424/304 |
| 3,980,050 | 9/1976 | Neubauer | 119/1 |
| 4,007,708 | 2/1977 | Yacono | 119/1 |
| 4,203,388 | 5/1980 | Cotigene et al. | 119/172 |
| 4,374,794 | 2/1983 | Kok | 264/141 |
| 4,494,482 | 1/1985 | Arnold | 119/173 |
| 4,560,527 | 12/1985 | Harke et al. | 119/1 |
| 4,619,862 | 10/1986 | Sokolowski et al. | 119/1 |
| 4,621,011 | 11/1986 | Fleischer et al. | 119/1 |
| 4,664,064 | 5/1987 | Lowe | 119/1 |
| 4,721,059 | 1/1988 | Lowe et al. | 119/1 |
| 4,930,443 | 6/1990 | Lowe, Jr. et al. | 119/172 |
| 5,016,568 | 5/1991 | Stanislowski et al. | 119/173 |
| 5,018,482 | 5/1991 | Stanislowsk et al. | 119/173 |
| 5,655,480 | 8/1997 | Steckel | 119/171 |
| 5,735,232 | 4/1998 | Lang et al. | 119/171 |

FOREIGN PATENT DOCUMENTS 1 513 292  6/1978  United Kingdom ........... A01K 1/015

OTHER PUBLICATIONS

Sodium Borate listed in the Merck Index, 8th edition, published by Merck & Co., Inc., 1968.
Abstract from article listed in the Journal of Pharmacology entitled, Sulfhydryl–dependent biotransformation and macromolecular binding of 1,2–dibromo–2,4–dicyanobutane in blood, 1998.
Web Site of Chemical Company Sigma–Aldrich http://www.sigma.com (searches for Borax and 1,2 diboromo–2, 4–dicyanobutane), Nov. 1998.
"Encyclopedia of Chemical Technology" by Kirk Othmer 2nd Edition, vol. 5, pp. 541–557, Nov. 1998.
Webster's Dictionary, 10th Edition, Nov. 1998.
Web Site Search for Borax/Sodium Borate http://encyclopedia.com, Nov. 1998.

*Primary Examiner*—Peter M. Poon
*Assistant Examiner*—Judith A. Nelson
*Attorney, Agent, or Firm*—Olson & Hierl, Ltd.

[57] ABSTRACT

A cellulose-based animal litter product effective in the control of odors generated by animal wastes is disclosed. Selected cellulosic granules containing mineral filler are contacted with a bactericide to produce a bactericide impregnated cellulosic litter which is useful as a pet box litter. The cellulosic litter can also contain an organic clumping agent or an inorganic clumping agent, or both.

20 Claims, No Drawings

CELLULOSIC ANIMAL LITTER PRODUCT

FIELD OF THE INVENTION

This invention relates to a cellulosic animal litter product effective in the control of pet box odors including ammonia and to a method of making such a product.

BACKGROUND OF THE INVENTION

As an alternative to animal box litters made of clay, a variety of other commonly available natural materials have been utilized for purposes of absorption and deodorization of animal wastes. For example, wood shavings, sawdust, and alfalfa have been marketed for this use, however, each of these materials is easily dampened and slow to dry, thereby creating a favorable breeding environment for microorganisms. Moreover, such animal litter materials generally have little capacity for neutralizing and eliminating the unpleasant odors associated with animal wastes. Furthermore, these materials readily breakdown into a dust which is ineffective as an absorbent.

To alleviate the dust problem, these prior art animal box litter materials have been further processed by extrusion, compression, and the inclusion of binding agents in order to formulate pellets which are physically more durable. Binding agents such as molasses, glue, and starch have been used to this end in the prior art (see U.S. Pat. No. 3,789,797 to Brewer).

In order to mask the unpleasant odors of animal waste, fragrances have been added to the prior art litter, the fragrances becoming activated in the presence of moisture such as cat urine (see U.S. Pat. No. 3,675,625 to Miller et. al.). However, such fragrances can be rapidly lost by volatilization when the litter is in continuous use or during extended storage.

In addition, deodorizers such as chlorophyll and baking soda have been tried, but these additives have an inherently low odor absorption capacity which is further diminished by environmental factors such as high humidity and temperature (see U.S. Pat. No. 4,203,388 to Cortigene et. al.).

Antibacterial agents (bactericides) such as quaternary ammonia salts and sodium propionate have also been added to the litter to prevent the development of unpleasant odors by arresting the growth of odor-causing bacteria and fungi in the litter box (see U.S. Pat. No. 3,828,731 to White). In addition, these bactericides function to minimize the decomposition of the natural litter material (usually fibrous plant matter) as well.

SUMMARY OF THE INVENTION

A method of making a cellulosic animal litter product effective in the control of noxious odors and ammonia arising from the decomposition of animal wastes comprising contacting selected cellulosic granules with a bactericide which can be 1,2-dibromo-2,4-dicyanobutane, sodium borate, and mixtures thereof to produce an antimicrobial litter which is then applied to a pet litter box. The cellulosic granules contain no more than about 60% by weight of cellulose in combination with a mineral filler. The cellulosic animal litter can also contain an organic or inorganic clumping agent such as a galactomannan gum or sodium bentonite.

DETAILED DESCRIPTION OF THE PREFERRED EMBODIMENT

While the present invention is susceptible to embodiments in many different forms, the preferred embodiment of the invention is described below. It should be understood, however, that the present disclosure is to be considered as an exemplification of the principles of the invention and is not intended to limit the invention to the specific embodiments illustrated.

A cellulosic animal litter product useful in the control of noxious odors and ammonia arising from the decomposition of animal wastes in litter boxes is disclosed. The litter product is made by contacting cellulosic granules with a bactericide to produce an antimicrobial litter which is then introduced into a pet litter box.

Cellulosic granules suitable for the present purposes can be readily prepared using known processing expedients. Illustrative are granules and the processes therefor described in U.S. Pat. No. 4,203,388 to Cortigene et al., U.S. Pat. No. 4,374,794 to Kok, U.S. Pat. No. 4,619,862 to Sokolowski et al. and U.S. Pat. No. 4,621,011 to Fleischer et al. Other granulation processes can also be utilized.

In addition to the traditional cellulosic granule sources, other materials useful in practicing the present invention include particulate moieties derived from various plant sources, such as grains, fruits, cotton, vegetables, nuts, trees, grasses, peat, and the like. Representative cellulosic material sources from fruits include citrus pulp (from lemons, oranges, grapefruits, etc.), apple pulp, grape pulp, and the like. Representative cellulosic material sources from cotton include degraded cotton, cotton burns, cottonseed hulls, and the like. Representative cellulosic material sources from vegetables include beet pulp, tomato pulp, and the like. Representative cellulosic material sources from nuts include peanut shells, walnut shells, pecan shells, almond shells, and the like. Representative cellulosic material sources from grasses include alfalfa, hay, straw, and the like.

The cellulosic granules of the invention contain no more than about 60% by weight cellulose with the remainder comprising a mineral filler. The mineral filler is a member of the group consisting of kaolin, titanium dioxide, calcium carbonate, sodium bicarbonate, and mixtures thereof. Synthetic polymers and the like can also be included as filler. Binders generally known in the art, such as glue and starch, can be added to modify the physical properties of the granules. Fragrances and deodorizers can be added as well. In addition, a clumpable cellulosic animal litter can be produced by the addition of an organic or inorganic clumping agent.

The particle size of the cellulosic granules suitable as animal litter is in the range of about 250 to about 4,750 microns. The moisture content of the cellulosic granules usually is in the range of about 0 to about 14% by weight.

The cellulosic granules are combined with a bactericide which may be an aqueous solution or a solid particulate. The cellulosic granules can be combined with the bactericide in any convenient manner, such as by spraying, mixing, and the like.

The bactericide is a member of the group consisting of 1,2-dibromo-2,4-dicyanobutane, sodium borate, and mixtures thereof. Preferably the bactericide is 1,2-dibromo-2,4-dicyanobutane and more preferably it is mixture of 1,2-dibromo-2,4-dicyanobutane and sodium borate.

A preferred bactericide content of 1,2-dibromo-2,4-dicyanobutane in the celluose granules is in the range of about 0.65 to about 0.13% by weight. A preferred bactericide content of sodium borate in the cellulosic granules is in the range of about 0.5 to about 1% by weight. The bactericide can also contain an additive which is a member of the group consisting of sodium chloride, xanthan gum, dimethicone, attapulgite and mixtures thereof.

The animal litter of this invention is free-flowing. In an alternate embodiment, the present animal litter contain an organic clumping agent such as a gum, e.g., a galactomannan gum such as guar gum, or starch, celluose esters or ethers, and the like. The litter generally forms a clump of durable clump strength very quickly, i.e., within about 30 seconds to about one minute, of being wetted with an aqueous liquid, such as water or animal urine. The term "durable clump strength" as used herein means that such a so-formed wetted clump has a firmness of sufficient structural integrity and hardness to withstand mechanical separation from the unwetted litter for disposal substantially immediately, i.e., within about 30 seconds to about one minute of being wetted and retains such firmness for a period of at least 24 hours. Clump strength can be evaluated objectively or subjectively by any number of conventional methods known in the animal litter arts.

An inorganic clumping agent suitable for present purposes is a swelling clay such as sodium bentonite, alone or together with an organic clumping agent. The amount of clumping agent present can be in the range of about 0.5 to about 5 weight percent. Compositions described herein are expressed as "weight percent" (or percent by weight), unless otherwise noted, are calculated based upon the total weight of the animal litter.

The following EXAMPLE employs generally preferred materials to further illustrate the inventive method and product and is not intended to be limiting.

EXAMPLE 1:

ODOR AND AMMONIA CONTROL OF BACTERICIDE-TREATED CELLULOSIC LITTER

A study of the efficacy of odor and ammonia control of a cellulosic litter treated with various bactericides was performed. The cellulosic litter utilized contained about 60 weight percent cellulose fibers and about 40 weight percent particulate mineral filler. The particle size was about 4/20 mesh, U.S. Sieve Series. The bactericides used in this study were sodium borate ($B_4Na_2O_7$) liquid or powder at concentrations of either 0.5% by wt. or 1% by wt.; and a commercially available formulation of the bactericide 1,2-dibromo-2,4-dicyanobutane (Tektamer 38 A.D., Calgon, Pittsburgh, PA) which also contains the additives sodium chloride, xantham gum, and dimethicone. This bactericide is labelled as "Bactericide A" in TABLE 1 for convenience. Mixtures of the bactericides mentioned above were also applied to the cellulosic litter for evaluation of odor control ability.

The testing protocol involved formulating three samples of each bactericide-treated litter at a weight of about 200 g per sample. The litter was then inoculated with about 185 ml of a fecal matter slurry containing cat feces, urea, and urine salts. The litter was monitored on a daily basis for odors and ammonia levels.

The results of these measurements are listed in TABLE 1, below. The samples which were most effective in odor and ammonia control were the samples containing Bactericide A (Tektamer 38 A.D. with active ingredient of 1,2-dibromo-2,4-dicyanobutane) plus the second bactericide sodium borate. The litter sample having the most effective odor and ammonia control properties contained a mixture of Bactericide A (0.13% by wt.) and sodium borate powder (1% by wt.) having an odor control capacity of nine days and an ammonia control capacity of 23 days as compared to the untreated litter. A similar sample containing a mixture of Bactericide A (0.13% by wt.) and sodium borate liquid (1% by wt.) was also very effective, exhibiting an odor control capacity of seven days and ammonia control capacity of 28 days. Bactericide A was also effective when used alone at a concentration of 0.13% by wt., having an odor control capacity of 12 days and ammonia control capacity of 20 days. Sodium borate, however, was only mildly effective, even at its highest concentration of 1% by wt., having an odor control capacity of eight days and an ammonia control capacity of ten days.

TABLE 1

ODOR AND AMMONIA CONTROL CAPACITY OF BACTERICIDE-TREATED GRANULAR CELLULOSIC LITTER

| Sample | Average Days to Off Odor | Average Days To Ammonia |
| --- | --- | --- |
| Untreated Cellulosic Litter | 6 | 7 |
| Bactericide A @ 0.065% | 7 | 11 |
| Bactericide A @ 0.13% | 12 | 20 |
| $B_4Na_2O_7$ Liquid @ 0.5% | 7 | 10 |
| $B_4Na_2O_7$ Powder @ 0.5% | 6 | 9 |
| $B_4Na_2O_7$ Liquid @ 1% | 7 | 9 |
| $B_4Na_2O_7$ Powder @ 1% | 8 | 10 |
| Bactericide A @ 0.13% and $B_4Na_2O_7$ Liquid @ 1% | 7 | 28 |
| Bactericide A @ 0.065% and $B_4Na_2O_7$ Liquid @ 0.5% | 9 | 10 |
| Bactericide A @ 0.065% and $B_4Na_2O_7$ Powder @ 0.5% | 7 | 15 |

Bactericide A - Mixture of 1,2-dibromo-2,4-dicyanobutane, sodium chloride, xanthan gum, and dimethicone (Tektamer 38 A.D.).

It is to be understood that the present invention is not to be limited to the exact details set forth above. Still other variations are possible without departing from the spirit and scope of the present invention.

We claim:

1. A method of making a cellulosic animal litter product effective in the control of noxious odors and ammonia arising from decomposing animal wastes which comprises contacting selected cellulosic granules with a bactericide which is a member of the group consisting of at least one of 1,2-dibromo-2,4-dicyanobutane, sodium borate, and mixtures thereof, to produce an antimicrobial litter, wherein the cellulosic granules contain no more than about 60% by weight of cellulose in combination with a mineral filler.

2. The method of claim 1 wherein the mineral filler is a member of the group consisting of kaolin, titanium dioxide, calcium carbonate, sodium bicarbonate, and mixtures thereof.

3. The method of claim 1 wherein the selected cellulosic granules have a particle size in the range of about 250 to about 4,750 microns.

4. The method of claim 1 wherein the moisture content of the selected cellulosic granules is in the range of about 0 to about 14% by weight.

5. The method of claim 1 wherein a binder is included in the cellulosic granules.

6. The method of claim 1 wherein a fragrance is added to the cellulosic granules.

7. The method of claim 1 wherein a deodorizer is added to the cellulosic granules.

8. The method of claim 1 wherein the bactericide is supplied as an aqueous solution.

9. The method of claim 1 wherein the bactericide is supplied as a solid particulate.

10. The method of claim 1 wherein the bactericide is 1,2-dibromo-2,4-dicyanobutane.

11. The method of claim 1 wherein the bactericide is sodium borate.

12. The method of claim 1 wherein the bactericide is a mixture of 1,2-dibromo-2,4-dicyanobutane and sodium borate.

13. The method of claim 1 wherein the bactericide content of 1,2-dibromo-2,4-dicyanobutane in the cellulosic granules is in the range of about 0.65 to about 0.13% by weight.

14. The method of claim 1 wherein the bactericide content of sodium borate in the cellulosic granules is in the range of about 0.5 to about 1% by weight.

15. The method of claim 1 wherein the bactericide contains an additive selected from the group consisting of sodium chloride, xantham gum, dimethicone, attapulgite and mixtures thereof.

16. The method of claim 1 wherein a clumping agent is combined with the cellulosic granules.

17. The method of claim 16 wherein the clumping agent is an organic clumping agent.

18. The method of claim 16 wherein the clumping agent is an inorganic clumping agent.

19. A cellulosic animal litter product made according to claim 1.

20. A cellulosic animal litter product made according to claim 16.

* * * * *